US010793135B2

(12) United States Patent
Pursifull et al.

(10) Patent No.: US 10,793,135 B2
(45) Date of Patent: Oct. 6, 2020

(54) HYBRID ELECTRIC VEHICLE FUEL CONSERVATION SYSTEM

(71) Applicant: FORD GLOBAL TECHNOLOGIES, LLC, Dearborn, MI (US)

(72) Inventors: Ross Dykstra Pursifull, Dearborn, MI (US); Thomas G. Leone, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 336 days.

(21) Appl. No.: 15/870,511

(22) Filed: Jan. 12, 2018

(65) Prior Publication Data
US 2019/0217844 A1    Jul. 18, 2019

(51) Int. Cl.
*B60W 10/06* (2006.01)
*B60W 10/08* (2006.01)
*B60W 10/105* (2012.01)

(52) U.S. Cl.
CPC ............ *B60W 10/06* (2013.01); *B60W 10/08* (2013.01); *B60W 10/105* (2013.01); *B60W 2510/246* (2013.01)

(58) Field of Classification Search
CPC ...... B60W 10/08; B60W 20/40; B60W 10/06; B60W 20/12; B60W 30/12; B60W 20/30; B60W 10/26; B60W 10/105; B60L 58/13; B60L 53/63; B60L 58/12; B60L 2240/72; B60L 2250/16
See application file for complete search history.

(56) References Cited

U.S. PATENT DOCUMENTS

| 8,560,155 B2 * | 10/2013 | Kedar-Dongarkar ........................ B60W 30/1882 701/22 |
| 8,731,752 B2 * | 5/2014 | Yu .......................... B60W 20/13 701/22 |
| 8,774,993 B2 * | 7/2014 | Harada .................. B60K 6/365 701/22 |
| 9,056,556 B1 * | 6/2015 | Hyde ...................... B60L 58/19 |
| 9,132,833 B2 * | 9/2015 | Hokoi .................. B60W 10/08 |
| 9,172,116 B2 * | 10/2015 | Ross ..................... H01M 10/44 |
| 9,488,493 B2 | 11/2016 | Mac Neille et al. |

(Continued)

*Primary Examiner* — Hunter B Lonsberry
*Assistant Examiner* — Luis A Martinez Borrero
(74) *Attorney, Agent, or Firm* — Brooks Kushman PC; David Kelley

(57) ABSTRACT

A hybrid electric vehicle (HEV) that includes one or more controller(s) configured to manage electric only and combustion engine drive modes, and at start-up, to generate a trip distance, and to detect an electric drive range, and battery, cabin, and powertrain thermal demands, among other conditions. The controller(s) engage a combustion engine drive mode if the distance exceeds the range, and the thermal demands exceed respective thresholds. The controller(s) also engage an electric drive mode if the range exceeds the distance, and the threshold exceed the thermal demands. Further variations include the controller(s) responsive to receiving a destination, and communicating the destination to a navigation system, and detecting if a charge event is likely to occur at the destination. In other arrangements, the controller(s) also adjust the trip distance upon detecting an historical probability of a charge event at the destination and whether the destination is a final destination.

12 Claims, 2 Drawing Sheets

(56) References Cited

U.S. PATENT DOCUMENTS

| | | | | |
|---|---|---|---|---|
| 9,499,161 B2* | 11/2016 | Ogawa | | B60W 10/08 |
| 9,714,837 B2 | 7/2017 | North et al. | | |
| 9,718,457 B2 | 8/2017 | Chen et al. | | |
| 9,902,392 B2* | 2/2018 | Ogawa | | B60W 20/40 |
| 10,065,628 B2* | 9/2018 | McGee | | B60W 10/26 |
| 10,435,007 B2* | 10/2019 | Follen | | B60W 50/0097 |
| 10,471,950 B2* | 11/2019 | Kim | | B60W 20/11 |
| 2005/0228553 A1* | 10/2005 | Tryon | | B60K 6/46 |
| | | | | 701/22 |
| 2006/0113129 A1* | 6/2006 | Tabata | | B60K 6/365 |
| | | | | 180/65.25 |
| 2010/0094496 A1* | 4/2010 | Hershkovitz | | G01C 21/3676 |
| | | | | 701/22 |
| 2012/0290159 A1* | 11/2012 | McGee | | B60W 10/26 |
| | | | | 701/22 |
| 2014/0114514 A1 | 4/2014 | Crombez et al. | | |
| 2014/0316939 A1* | 10/2014 | Uyeki | | B60L 50/16 |
| | | | | 705/26.9 |
| 2015/0294228 A1* | 10/2015 | Saito | | G06Q 50/06 |
| | | | | 706/48 |
| 2015/0314775 A1* | 11/2015 | Dextreit | | B60W 50/085 |
| | | | | 701/22 |
| 2016/0185339 A1* | 6/2016 | Ogawa | | B60W 20/40 |
| | | | | 701/22 |
| 2016/0207521 A1* | 7/2016 | Ogawa | | B60W 10/26 |
| 2016/0221567 A1* | 8/2016 | Ogawa | | B60W 20/40 |
| 2016/0221568 A1* | 8/2016 | Ogawa | | B60W 10/06 |
| 2016/0257301 A1* | 9/2016 | Ogawa | | B60W 20/40 |
| 2018/0170360 A1* | 6/2018 | Kim | | B60W 30/192 |
| 2018/0236995 A1* | 8/2018 | Iwamoto | | B60W 20/40 |
| 2018/0339697 A1* | 11/2018 | Ogawa | | B60K 6/445 |
| 2019/0126904 A1* | 5/2019 | Son | | B60W 20/12 |
| 2019/0140578 A1* | 5/2019 | Lee | | B60W 20/12 |
| 2019/0344774 A1* | 11/2019 | Pursifull | | B60W 10/08 |

* cited by examiner

HYBRID ELECTRIC VEHICLE FUEL CONSERVATION SYSTEM

TECHNICAL FIELD

The disclosure relates to plug-in hybrid electric vehicles and control systems for maximizing electric only operation while minimizing fuel consumption.

BACKGROUND

In electric and hybrid electric vehicles (HEVs), long and short distance travel or trips can be unnecessarily inefficient when the electric only (charge depletion) and combustion engine (charge sustain) drive modes are not optimally managed. In some HEVs, especially plug-in HEVs (PHEVs), the electric only or charge depletion drive mode range or maximum distance is typically much less than that of the combustion engine or charge sustain drive mode. Additionally, while some HEVs and PHEVs include manually selectable and/or semi-automatic drive mode control systems, many vehicles continue to experience less than optimal drive mode efficiency, such that charge depletion, electric only drive mode ranges/distances are much less, and charge sustain fuel consumption is much greater, than what might be possible with certain improvements.

This can be especially noticeable when electric energy is inefficiently consumed for powering vehicle accessories, instead of being conserved to extend electric drive maximum distance. Also, inefficient operation can be compounded when manual and semi-automatic drive mode systems are not optimized to select the most efficient drive mode for the instantaneous driving and vehicle conditions, such that too much electrical power and combustion fuel are consumer during operation.

Electric only and combustion engine drive mode efficiencies are affected by the ambient environment, vehicle performance and component conditions, and other factors, which can introduce undesirable inefficiencies during operation of the drive modes. In view of the stochastic nature of ever changing environmental, vehicle, and component conditions, such drive mode control inefficiencies have persisted despite some attempts at improvements. Some such attempts have been directed to enabling charge sustain and depletion drive modes in response to driver requests, as well as enabling the charge sustain, combustion engine drive mode in response to detecting a depleted battery state of charge (SoC). However, opportunities for improvement to HEV operating efficiencies remain despite these attempts.

SUMMARY

Hybrid, plug-in hybrid, and battery electric vehicles (HEVs, PHEVs, BEVs, herein collectively referred to in general as "HEVs") include a high voltage traction battery or batteries, navigation systems, vehicle sensors, onboard computing and communications systems, and related and other components, which are utilized with other HEV systems to enable travel and management of electric and combustion engine drive and propulsion systems. The disclosure is directed to improved systems and methods for more efficiently controlling such drive and propulsion systems, by utilizing the various components, sensors, and computing systems in new ways, such that HEV performance and efficiency over various travel routes can be maximized with both minimum fuel consumption and maximum electric drive ranges and distances.

The disclosure is directed to hybrid electric vehicles (HEVs) and plug-in HEVs (PHEVS) and similarly capable vehicles, which include one or more controller(s) and computing systems that are configured to manage electric only (charge depletion) and combustion engine (charging and charge sustain) drive modes. Such controller(s) and systems are also configured to, at start-up, to generate and/or estimate a trip distance or trip distance estimate, to detect an electric drive and/or charge depletion range, and to detect battery, cabin, powertrain, and other vehicle component thermal demands, among other capabilities and conditions.

In exemplary arrangements of the disclosure, the controller(s) engage a combustion engine drive mode if the trip distance or estimate exceeds the electric or charge depletion range, and if the thermal demands exceed cumulative and/or respective individual thermal demand thresholds. The controller(s) are also configured to switch to and engage the electric drive mode if the electric drive range exceeds the trip distance, and the individual and/or cumulative thermal demands do not exceed the cumulative and/or respective thermal thresholds of the various vehicle components, such as a transaxle, a battery, an intercooler, a cabin heater, an emissions control system, and other components and systems.

Such controller(s) are also modified in other arrangements to respond to the trip signal, and to detect one or more of the trip distance, an electric range, and battery, cabin, and powertrain temperatures. Similar to other adaptations, the controller(s) are also enabled to engage the electric drive and/or charge depletion drive mode if at least one of: the electric range exceeds the trip distance, and the battery, cabin, and powertrain temperatures do not exceed respective temperature thresholds. Further, the controller(s) also engage the combustion engine, charge sustain, and/or charging drive mode, if the distance exceeds the range and the temperatures exceed the thresholds.

In other variations, the controller(s) also respond to receiving the destination, and generate and/or estimate the trip distance or trip distance estimate according to a current location of the HEV and the destination. Also contemplated by the disclosure is the controller(s) adapted to respond to receiving the destination, and to communicate the destination to a navigation system, causing the controller(s) to detect if a charging station is located at the destination, according to a navigation system response. In these configurations, the controller(s) are also modified to detect an historical probability of a charge event at the destination, and to generate the trip distance to be a one-way distance if the historical probability exceeds a charge probability threshold, such that the electric drive and/or charge depletion drive mode is engaged when the one-way distance is less than, below, and/or does not exceed the range.

In other arrangements of the disclosure, the controller(s) are modified to also detect the historical probability of a round-trip distance, and to generate and/or estimate the trip distance to be a round-trip distance if the historical probability exceeds a round-trip probability threshold, such that the combustion engine, charge sustain, and/or charging drive mode is engaged when the round-trip distance exceeds the range. Variations further contemplate the controller(s) configured to detect the historical probability that the destination is not a final destination, and to engage the combustion engine, charge sustain, and/or charging drive mode when the historical probability is below, less than, and/or does not exceed a final destination probability threshold.

Similar configurations further enable the controller(s) to detect the historical probability that the destination is the final destination that includes the charge event, and to generate and/or estimate the trip distance to be the one-way distance when the historical probability exceeds a combination final destination and charge event probability threshold, and further, to engage the electric/charge depletion drive mode when the range exceeds the one-way distance, and such that the combustion engine/charge sustain/charging drive mode is engaged when at least one of the one-way distance exceeds the range and the historical probability is below, less than, and/or does not exceed the final destination and charge event probability threshold.

In further variations according to the disclosure, the controller(s) are also configured to disengage the combustion engine drive mode, and engage the electric drive mode, in response to detecting signal conditions for at least one of idling and low engine efficiency. In cooperative configurations and other adaptations, the controller(s) are further configured to: disengage the combustion engine drive mode, and engage the electric drive mode, in response to detecting a thermal load demand reduction below a threshold for at least one of: the battery, the cabin heater, the intercooler, the transaxle, the emissions control system, and/or other vehicle components and systems.

Such arrangements also contemplate the controller(s) modified to disengage the electric drive mode, and engage the combustion engine drive mode, in response to detecting the thermal load demand increase above the threshold for at least one of: the battery, the cabin heater, the intercooler, the emissions control system, the transaxle, and/or other vehicle components and systems.

The disclosure also includes methods of controlling the HEV for each of the described variations, modifications, and/or arrangements, and which for further example include, by the controller(s), generating the trip distance, and detecting the electric range, and the battery, cabin, and powertrain thermal demands, and engaging the combustion engine/charge sustain/charging drive mode if at least one of: the trip distance exceeds the electric range, and one or more of the thermal demands exceed respective thresholds, such that the electric drive/charge depletion drive mode is engaged if the range exceeds the distance and the respective thresholds exceed the thermal demands.

Further variations include the methods directed to communicating the destination to the navigation system, and detecting if the charging station is located at the destination according to the navigation system response. The methods also include modifications for detecting the historical probability of the charge event at the destination, and generating the distance to be the one-way distance if the historical probability exceeds the charge probability threshold, such that the electric drive/charge depletion drive mode is engaged when the range exceeds the one-way distance.

The methods according to the disclosure also include by the controller, and in response to receiving the destination, detecting the historical probability that the destination is the final destination that includes the charge event. The methods of the controller(s) also include generating the distance to be the one-way distance when the historical probability exceeds the final destination and charge event probability threshold, engaging the electric drive/charge depletion drive mode when the range exceeds the one-way distance, and such that the combustion engine/charge sustain/charging drive mode is engaged instead when at least one of the one-way distance exceeds the range and the historical probability is below, less than, and/or does not exceed the final destination and charge event probability threshold.

In other adaptations of the methods of the disclosure, the controller(s) are further configured for disengaging the combustion engine/charge sustain/charging drive mode, and engaging the electric drive mode, in response to detecting: signal conditions for at least one of idling and low engine efficiency, and a thermal load demand reduction below the threshold for at least one of: the battery, the cabin heat heater, the intercooler, the emissions control system, and the transaxle.

This summary of the implementations and configurations of the HEVs and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

Additionally, this summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
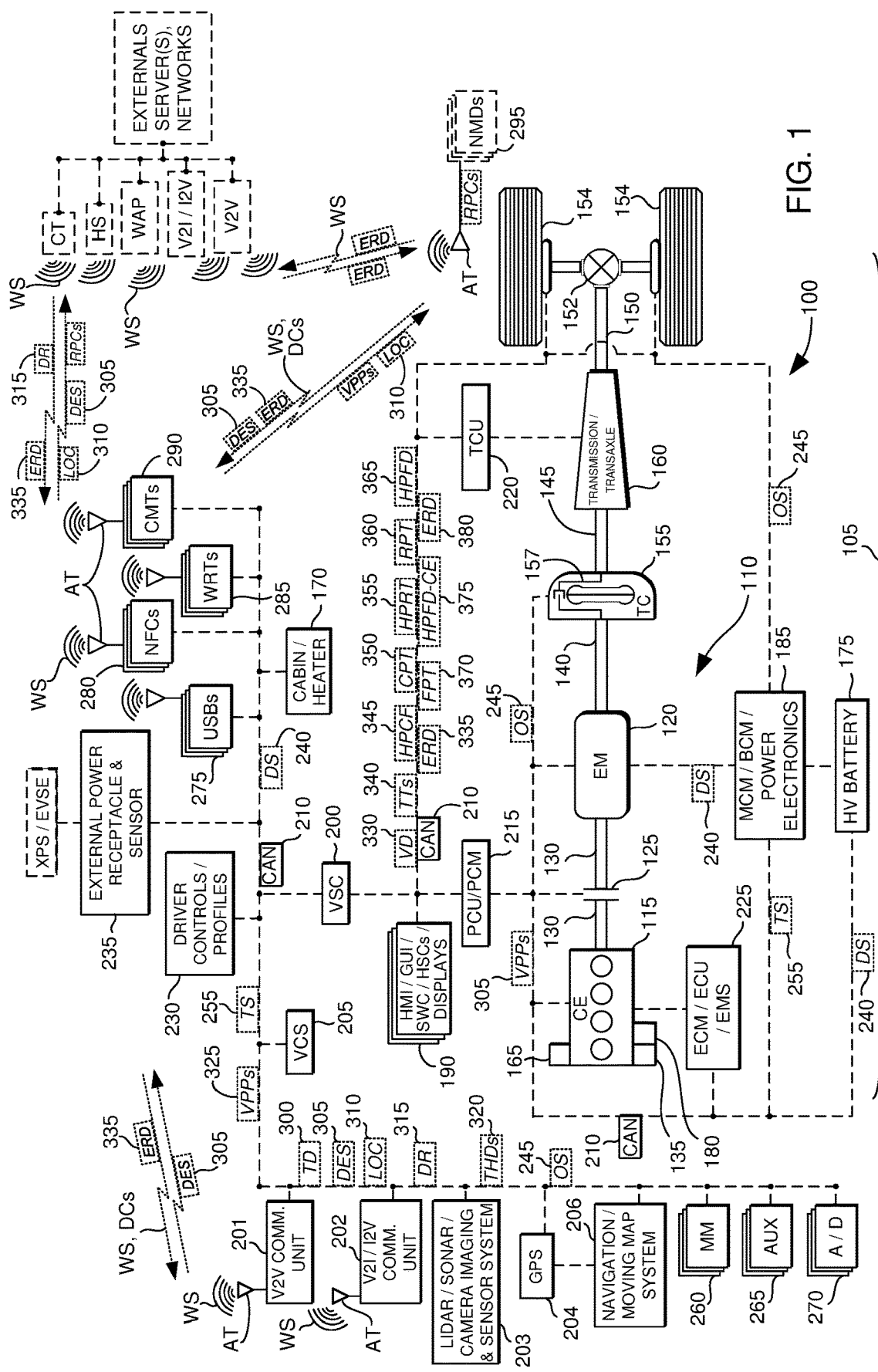
FIG. 1 is an illustration of a combustion engine and hybrid electric vehicle and its systems, components, sensors, actuators, and methods of operation.
Figure 2:
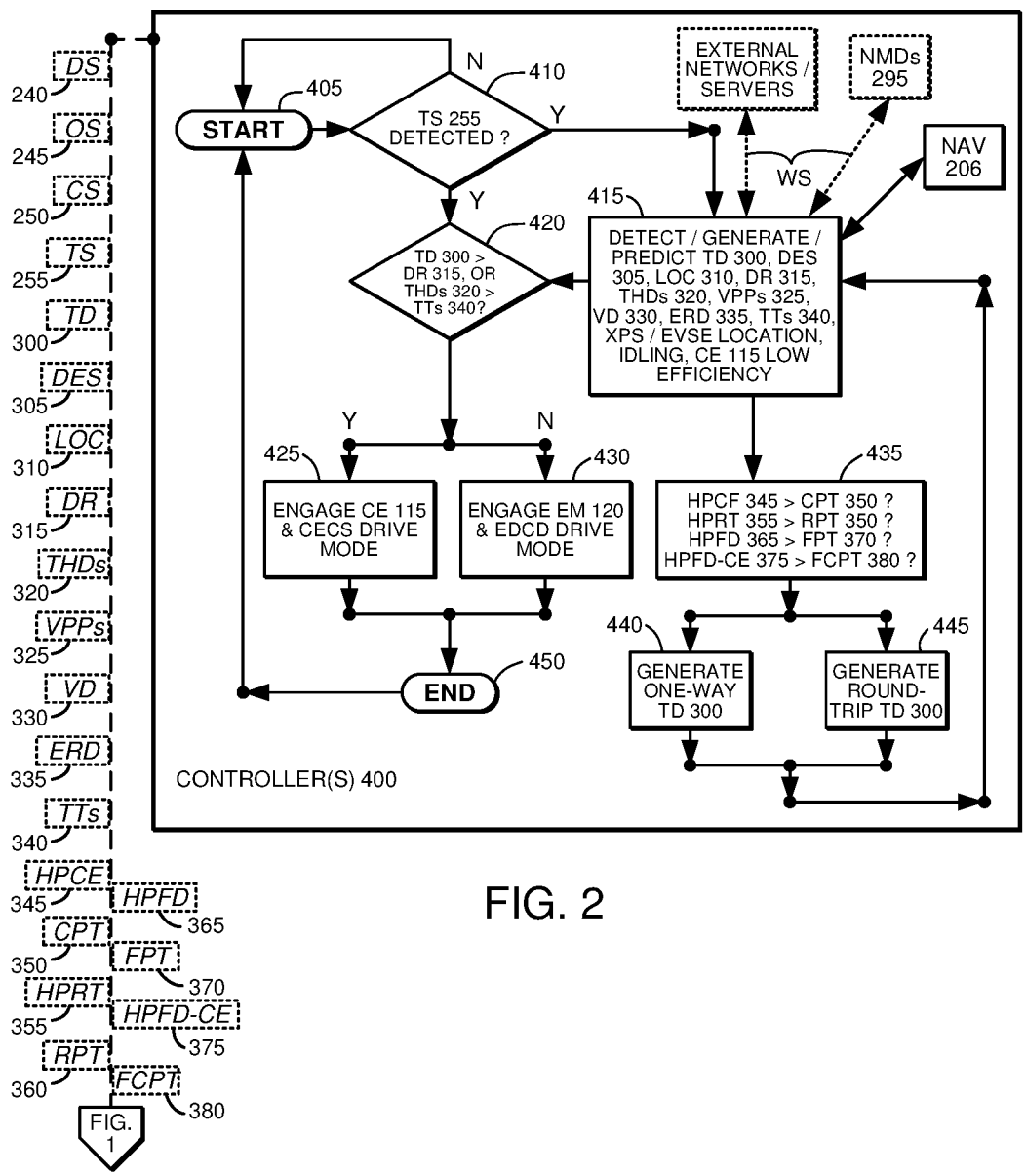
FIG. 2 illustrates certain aspects of the disclosure depicted in FIG. 1, with components removed and rearranged for purposes of illustration.

With reference now to the various figures and illustrations and to FIGS. 1 and 2, and specifically to FIG. 1, a schematic diagram of a combustion engine and/or hybrid electric vehicle (HEV) 100 is shown, and illustrates representative relationships among components of HEV 100, which can also be a battery electric vehicle (BEV), a plug-in hybrid electric vehicle (PHEV), and combinations and modifications thereof, which are herein collectively referred to as an "HEV". Physical placement and orientation of the components within vehicle 100 may vary.

Vehicle 100 includes a driveline 105 that has a powertrain 110, which includes a combustion engine (CE) 115 and/or an electric machine or electric motor/generator/starter (EM) 120, which generate power and torque to propel vehicle 100. Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices (FEADs) described elsewhere herein. CE 115 is coupled to motor/generator, M/G, electric machine or EM 120 with a disconnect clutch 125. CE 115 generates such power and associated engine output torque for transmission to EM 120 when disconnect clutch 125 is at least partially engaged.

EM 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to EM 120 to enable operation as an electric generator, and to other components of vehicle 100. Similarly, EM 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, EM or electric machine 120 may assist engine 115 in a "hybrid electric mode" or an "electric assist mode" by transmitting additional power and torque to turn drive shafts 130 and 140. Also, EM 120 may operate in an electric only mode wherein engine 115 is decoupled by disconnect clutch 125 and which may be shut down, enabling EM 120 to transmit positive or negative (reverse) mechanical torque to EM drive shaft 140 in forward and reverse directions. When in a generator mode, EM 120 may also be commanded to produce negative electrical torque (when being driven by CE 115 and/or other drivetrain elements) and to thereby generate electricity for charging batteries and powering vehicle electrical systems, and while CE 115 is generating propulsion power for vehicle 100. EM 120 and/or other electric motor generators also may enable regenerative braking when in generator mode by converting rotational, kinetic energy from powertrain 110 and/or wheels 154 during deceleration, into negative electrical torque, and into regenerated electrical energy for storage, in one or more batteries 175, 180, as described in more detail below.

Disconnect clutch 125 may be disengaged to enable engine 115 to stop or to run independently for powering engine accessories, while EM 120 generates drive power and torque to propel vehicle 100 via EM drive shaft 140, torque convertor drive shaft 145, and transmission and/or transaxle output drive shaft 150. In other arrangements, both engine 115 and EM 120 may operate with disconnect clutch 125 fully or partially engaged to cooperatively propel vehicle 100 through drive shafts 130, 140, 150, differential 152, and wheels 154.

Each or any such components may also be combined in part and/or entirely in and/or cooperatively with a comparable and/or complementary transaxle configuration. Driveline 105 may be further modified to enable regenerative braking from one or any or all wheel(s) 154, using a selectable and/or controllable differential torque capability. Although FIG. 1 schematically depicts two wheels 154, the disclosure contemplates driveline 105 to include additional wheels 154.

The schematic of FIG. 1 also contemplates alternative configurations with more than one engine 115 and/or EM 120, which may be offset from drive shafts 130, 140, and where one or more of engines 115 and EMs 120 are positioned in series and/or in parallel elsewhere in driveline 105, such as between or as part of a torque convertor and a transmission, and/or a transaxle, off-axis from the drive shafts, and/or elsewhere and in other arrangements. Still other variations are contemplated without deviating from the scope of the present disclosure.

Driveline 105 and powertrain 110 also include a transmission and/or transaxle that includes a torque convertor (TC) 155, which couples engine 115 and EM 120 of powertrain 110 with and/or to transmission and/or transaxle 160. TC 155 may further incorporate a bypass clutch and clutch lock 157 that may also operate as a launch clutch, to enable further control and conditioning of the power and torque transmitted from powertrain 110 to other components of vehicle 100. CE 115 may further include an intercooler and/or emissions control system 165 configured to improve efficiency and reduce undesirable exhaust emissions of CE 115. A vehicle cabin is also generally depicted by reference numeral 170, and may include a cabin heater, climate controls and a temperature sensor also represented by reference numeral 170.

Powertrain 110 and/or driveline 105 further include one or more batteries 175, 180. One or more such batteries can be a higher voltage, direct current battery or batteries 175 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, EM 120, and vehicle 100, as depicted in FIG. 1, through various mechanical and electrical interfaces and vehicle controllers, as described elsewhere herein. High voltage EM battery 175 is also coupled to EM 120 by one or more of a motor control module (MCM), a battery control module (BCM), and/or power electronics 185, which are configured to convert and condition direct current (DC) power provided by high voltage (HV) battery 175 for EM 120.

MCM/BCM/power electronics 185 are also configured to condition, invert, and transform DC battery power into three phase alternating current (AC) as is typically required to power electric machine or EM 120. MCM/BCM 185/power electronics is also configured to charge one or more batteries 175, 180 with energy generated by EM 120 and/or front end accessory drive components, and to receive, store, and supply power from and to other vehicle components as needed. Such controllers, including for example, those incorporated with power electronics 185 are configured to monitor battery sensors to detect voltage, current, state-of-charge (SoC), charge the battery(ies), to adjust and control a charge-rate and charge-time therefor, to monitor and estimate fuel economy, to monitor recharging, and to discharge and deliver power from the battery(ies), among other capabilities.

With continued reference to FIG. 1, vehicle 100 further includes one or more controllers and computing modules and systems, in addition to MCM/BCM/power electronics 185, which enable a variety of vehicle capabilities. For example, vehicle 100 may incorporate a vehicle system controller (VSC) 200 and a vehicle computing system (VCS) and controller 205, which are in communication with MCM/BCM 185, and other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components, as is illustrated schematically in the figures, for purposes of example without limitation, as dotted and/or dashed lines, and with similar schematic and graphical representations.

Such CANs 210 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/43.040.15/x/.

With continued reference to FIG. 1, vehicle 100 further includes one or more controllers and computing modules and systems, in addition to the controller(s) already described, which enable a variety of vehicle capabilities. For example, in some configurations for purposes of example but not limitation, VSC 200 and/or VCS 205 is/are and/or incorporates the SYNC™, APPLINK™, MyFord Touch™ and/or open source SmartDeviceLink and/or OpenXC onboard and offboard vehicle computing systems, in-vehicle connectivity, infotainment, and communications system and application programming interfaces (APIs), for communication and control of and/or with offboard and/or external devices, systems, and components.

For further examples, but not for purposes of limitation, at least one of and/or one or more of the controller(s) such as VSC 200 and VCS 205, may incorporate and further be and/or include one or more accessory protocol interface modules (APIMs) and/or an integral or separate head unit, which may be, include, and/or incorporate an information and entertainment system (also referred to as an infotainment system and/or an audio/visual control module or ACM/AVCM). Such modules include and/or may include a multimedia devices such as a media player (MP3, Blu-Ray™, DVD, CD, cassette tape, etc.), stereo, FM/AM/satellite radio receiver, and the like, as well as a human machine interface (HMI) 190, graphical user interface (GUI) 190, and/or display unit(s) 190 as described elsewhere herein.

Such contemplated components and systems are available from various sources, and are for purposes of example manufactured by and/or available from the SmartDeviceLink Consortium, the OpenXC project, the Ford Motor Company, and others. See, for example, SmartDeviceLink.com, openXCplatform.com, www.ford.com, U.S. Pat. Nos. 9,080,668, 9,042,824, 9,092,309, 9,141,583, 9,141,583, 9,680,934, and others.

In further examples, SmartLinkDevice (SDL), OpenXC, and SYNC™ AppLink™ are each illustrative exemplars that enable at least one of and/or one or more of the controller(s) such as VSC 200 and VCS 205, to communicate remote procedure calls (RPCs) utilizing embedded application programming interfaces (APIs) that enable command and control of internal and external or onboard and offboard devices, mobile devices, and applications, by utilizing in-vehicle or onboard HMIs, GUIs, and other input and output devices 190.

Such further include onboard vehicle instrument cluster hardware and software controls (HSCs), buttons, and/or switches, as well as steering wheel controls and buttons (SWCs), instrument cluster and panel hardware and software buttons and switches 190, among other controls, also depicted in the figures schematically and collectively with reference numeral 190 (FIG. 1). Exemplary systems such as SDL, OpenXC, and/or AppLink™ enable functionality of the mobile device to be available and enabled utilizing the HMI of vehicle 100 such as HSCs, SWCs, HMIs, and GUIs 190.

VCS 205 and/or other controller(s) may include, be configured with, and/or cooperate with one or more communications, navigation, and other systems, units, controllers, and/or sensors, such as a vehicle to vehicle communications system (V2V) 201, and roadway and cloud-based network infrastructure to vehicle and vehicle to infrastructure communication system (I2V, V2I) 202, a LIDAR/SONAR (light and/or sound detection and ranging) and/or video camera roadway proximity imaging and obstacle sensor system 203, a GPS or global positioning system 204, and a navigation and moving map display and sensor system 206.

Such communications systems, units, controllers, may be configured with, as, and be part of other communications units and enable bidirectional communications by wired and wireless communications that may include cellular, wireless ethernet and access points such as WiFi™ wireless capabilities, near field communications such as Bluetooth™, and many others. The VCS 205 can cooperate in parallel, in series, and distributively with VSC 200 and other controllers to manage and control HEV 100 and such other controllers, and/or actuators, in response to sensor and communication signals, data, parameters, and other information identified, established by, communicated to, and received from these vehicle systems, controllers, and components, as well as other systems external and/or remote to HEV 100.

While illustrated here for purposes of example, as discrete, individual controllers, MCM/BCM 185, VSC 200, and VCS 205 may control, be controlled by, communicate signals to and from, and exchange data with other controllers, and other sensors, actuators, signals, and components that are part of the larger vehicle and control systems, external control systems, and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed combinations.

Further, communications over the network and CAN 210 are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, MCM/BCM 185, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing and communicating data.

With attention invited again to FIG. 1, HEV 100 also may include a powertrain control unit/module (PCU/PCM) 215 coupled to VSC 200 or another controller, and coupled to CAN 210 and engine 115, EM 120, and TC 155 to control each powertrain component. A transmission and/or transaxle control unit (TCU) 220 is also coupled to VSC 200 and other controllers via CAN 210, and is coupled to transmission and/or transaxle 160 and also optionally to TC 155, to enable operational control. An engine control module (ECM) or unit (ECU) or energy management system (EMS) 225 may also be included having respectively integrated controllers and be in communication with CAN 210, and is coupled to engine 115 and VSC 200 in cooperation with PCU 215 and TCU 220 and other controllers.

In this arrangement, VSC 200 and VCS 205 cooperatively manage and control the vehicle components and other controllers, sensors, and actuators, including for example without limitation, PCU 215, TCU 220, MCM/BCM 185, and/or ECU/EMS 225, among various others. For example, the controllers may communicate control commands, logic, and instructions and code, data, information, and signals to and/or from engine 115, disconnect clutch 125, EM 120, TC 155, transmission and/or transaxle 160, batteries 175, 180, and MCM/BCM/power electronics 185, and other components and systems.

The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers. Such control commands, logic, and instructions and code, data, information, signals, settings, and parameters, including driver preferred settings and preferences, may be captured and stored in, and retrieved and communicated from a repository of driver controls and profiles 230.

For further example, various other vehicle functions, actuators, and components may be controlled by the controllers within and in cooperation with HEV 100 systems and components, and may receive signals from other controllers, sensors, and actuators, which may include, for purposes of illustration but not limitation, front-end accessory drive (FEAD) components and various sensors for battery charging or discharging, including sensors for detecting and/or determining the maximum charge, charge-state or state-of-charge (SoC), voltage and current, battery chemistry and life-cycle parameters, and discharge power limits, external environment ambient air temperature, pressure, humidity, and component temperatures, voltages, currents, and battery discharge power and rate limits, and other components. Such sensors are configured to communicate with the controllers and CAN 210 and may, for further example, establish or indicate: ignition switch position and a key-on or key-off condition, external and internal temperatures and pressures, engine and thermal management system sensor conditions, charge receptacle sensor conditions, and/or external power source voltage, current, and related data communications sensor conditions, among others.

HEV 100 also includes at least one external power source receptacle and sensor 235, which is coupled with the various controllers, including for example BCM/MCM/power electronics 185 and HV battery 175. Receptacle 235 is utilized when HEV 100 is stationary and parked adjacent to an external power source (XPS), such as in a home, office, or other electrical power charging station or location, which stations are also known to those knowledgeable in the technology as electric vehicle supply equipment (EVSE). These controllers are configured to detect the presence of XPS when it is connected to receptacle 235, and to initiate a charging/recharging cycle or event of HV battery 175, battery 180, as well as enabling power to be supplied to HEV 100 for various purposes.

Such controllers may also enable bidirectional communication between HEV 100 and external XPS/EVSE to establish power capacity, cost of power, power use authorization, compatibility, and other parameters and information about and from the external XPS. Such communications between HEV 100 and external XPS may enable automated charging, purchase of power, and may enable communication between external XPS and VSC 200 and VCS 205, as well as communication with remote systems external to HEV 100 and its various controllers. Additionally, HEV 100 may autonomously interact with both external XPS and one or more of VSC 200 and VCS 205 to communicate information to enable automated charging of HEV 100, and estimating of fuel economy, and communications of various vehicle and systems data and parameters to such external systems.

To enable charging of the HV battery(ies) 175 and/or other batteries, one or more of the controllers, such as those included with BCM/MCM/power electronics 185 are configured to detect external XPS being connected to receptacle 235, and to generate and communicate an external-power signal or direct-current charge-signal (DS) 240, which may include earlier described information indicating connection to XPS, power available from XPS, cost of such power, compatibility data, and use-authorization and authentication data, and related information. In response, the power electronics 185 and/or other controllers initiate charging at a charge-rate of the battery(ies) 175, 180 or others. Additionally, the various controller(s) may also generate DS 240 in response to depletion of batteries 175, 180, or others, such that BCM/MCM/power electronics 185 may initiate charging via ICE 115 and EM 120, and other charging capabilities.

As described and illustrated in the various figures, including FIGS. 1 and 2, the signals and data, including for example, external-power signal DS 240, and related control logic and executable instructions and other signals, and data can also include other signals (OS) 245, and control or command signals (CS) 250 received from and sent to and between controllers and vehicle components and systems. The external-power signal DS 240, OS 245, and CS 250, and other signals, related control logic and executable instructions, parameters, and data can and/or may be predicted, generated, established, received, communicated, to, from, and between any of the vehicle controllers, sensors, actuators, components, and internal, externals, and remote systems.

Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIGS. 1 and 2, and by flow charts or similar diagrams as exemplified in the methods of the disclosure illustrated specifically in FIG. 2. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/firmware, and combinations thereof.

With continuing reference to the various figures, including FIG. 1 the disclosure contemplates HEV 100 including at least one and/or one or more of the controller(s) coupled to the battery(ies) 175, 180, which controller(s) may be any of VSC 200, VCS 205, PCU 215, TCU 220, MCM/BCM 185, and/or ECU/EMS 225, and a communication unit or units, such as VSC 200, V2V 201, I2V/V2I 202, and/or communications units incorporated with VCS 205. At least one, one or more, and/or any of such controllers are also configured to generate and communicate a trip signal TS 255, which identifies or indicates a vehicle key-on condition, upon start-up and initial operation of HEV 100. One or more of these controller(s) are coupled to at least one and/or one or more of the vehicle onboard communications units 200, 201 202, 205, and others.

HEV 100 may also further include, incorporate, be paired to, synchronized with, and/or be coupled with, as such communication units and/or as components and/or subsystems thereof, one or more and/or at least one vehicle-based and onboard multimedia devices 260 (MM), auxiliary input(s) 265 (AUX), and analog/digital (A/D) circuits 270, universal serial bus port(s) (USBs) 275, near field communication transceivers (NFCs) 280, wireless routers and/or transceivers (WRTs) 285, such as Bluetooth™ devices, that enable wireless personal and local area networks (WPANs, WLANs) or "WiFi" IEEE 802.11 and 803.11 communications standards.

The controller(s) and devices(s) of vehicle 100 are also coupled with, incorporate, and/or include onboard and/or offboard analog and digital cellular network modems and transceivers (CMTs) 290 utilizing voice/audio and data encoding and technologies that include for example, those managed by the International Telecommunications Union (ITU) as International Mobile Telecommunications (IMT) standards, which are often referred to as global system for mobile communications (GSM), enhanced data rates for GSM evolution (EDGE), universal mobile telecommunications system (UMTS), 2G, 3G, 4G, 5G, long-term evolution (LTE), code, space, frequency, polarization, and/or time division multiple access encoding (CDMA, SDMA, FDMA, PDMA, TDMA), and similar and related protocols, encodings, technologies, networks, and services.

Such contemplated onboard and offboard devices and components, among others, are configured to enable bidirectional wired and wireless communications between components and systems of vehicle 100, CAN 210, and other external devices and systems and PANs, LANs, and WANs. A/D circuit(s) 270 is/are configured to enable analog-to-digital and digital-to-analog signal conversions. Auxiliary inputs 265 and USBs 275, among other devices and components, may also enable in some configurations wired and wireless Ethernet, onboard diagnostic codes and parameter/performance identifiers and information data (OBD, OBD II, PIDs) communications, free-space optical communication such as Infrared (IR) Data Association (IrDA) and non-standardized consumer IR data communication protocols, IEEE 1394 (FireWire™ (Apple Corp.), LINK™ (Sony), Lynx™ (Texas Instruments)), EIA (Electronics Industry Association) serial protocols, IEEE 1284 (Centronics Port protocols), S/PDIF (Sony/Philips Digital Interconnect Format), and USB-IF (USB Implementers Forum), and similar data protocols, signaling, and communications capabilities.

Auxiliary inputs 265 and A/D circuits 270, USBs 275, NFCs 280, WRTs 285, and/or CMTs 290, is/are coupled with, integrated with, and/or may incorporate integral amplifier, signal conversion, and/or signal modulation circuits, which are configured to attenuate, convert, amplify, and/or communicate signals, and which are further configured to receive various analog and/or digital input signals, data, and/or information that is processed and adjusted and communicated to and between the various wired and wireless networks and controllers.

Such wired and wireless contemplated networks and controllers include, for example but not limitation, CAN 210, VSC 200, VCS 205, and other controllers and networks of vehicle 100. Auxiliary inputs 265, A/D circuits 270, USBs 275, NFCs 280, WRTs 285, and/or CMTs 290, and related hardware, software, and/or circuitry are compatible and configured to receive, transmit, and/or communicate at least one of and/or one or more of a variety of wired and wireless signals, signaling, data communications, and/or data streams (WS), and data such as navigation, audio and/or visual, and/or multimedia signals, commands, control logic, instructions, information, software, programming, and similar and related data and forms of information.

Additionally, one or more input and output data communication, audio, and/or visual devices 190, are contemplated to be integrated with, coupled to, and/or connectable to, auxiliary inputs 265, A/D circuits 270, USBs 275, NFCs 280, WRTs 285, and/or CMTs 290, as well as to the other contemplated controller(s) and wired and wireless networks internal to vehicle 100, and in some circumstances external to and offboard vehicle 100. For example, the one or more input and output devices include additional display(s) 190, and nomadic and mobile devices (NMDs) 295, among others, which each include at least one and/or one or more integrated signaling and communications antennas and/or transceivers (AT).

Such input and output devices 190 are and/or may be selectable, connectable, synchronized with, paired to, and/or actuatable with an input selector that may be any of HSCs 190, and may also include, incorporate, and/or be integrated with and/or as part of GUI 190 and the contemplated hardware and software HSCs, SWCs, controls, buttons, and/or switches 190. Such HSCs 190, as already noted, may be hardware or software or combinations thereof and may be configurable utilizing one or more predetermined, default, and adjustable factory and/or driver controls, profiles, and/or preferences of repository 230.

The contemplated additional display(s) 190, NMDs 295, and/or other portable auxiliary devices, may further include for example but not limitation, cell phones, mobile phones, smart phones, satellite phones and modems and communications devices, tablets, personal digital assistants, personal media players, key fob security and data storage devices, personal health devices, laptops, portable wireless cameras, headsets and headphones that may include microphones, wired and wireless microphones, portable NFC and Bluetooth compatible speakers and stereo devices and players, portable GPS and GNSS and navigation systems and devices, and similar devices and components that each may include integrated transceivers and antennas AT, wired, wireless, and plugged data connectors and data connections (DCs), and related components, for wired and wireless multimedia and data communications signals WS.

Such contemplated input, output, and/or communications devices, components, subsystems, and systems onboard vehicle 100 are and/or may be configured to bidirectionally communicate over wired and wireless data connections DCs and wired and wireless signals and signaling and data communications and data streams WS, with external near and far nomadic, portable, and/or mobile devices 295, networks, and external communications systems (V2X) that may include, for example, roadway and infrastructure communications systems (V2I/I2V) 202, such as hotspots and wireless access points (HS/WAPs, FIG. 1), nano and micro and regular cellular access points and towers (CT, FIG. 1), and related and accessible external, remote networks, systems, and servers.

With continuing reference to the various figures, including FIGS. 1 and 2, it may be understood by those with knowledge in the relevant fields of technology that the disclosure contemplates vehicle and/or HEV 100 to include at least one and/or one or more controller(s) such as VSC 200, VCS 205, and others coupled with one or more an in-vehicle or onboard transceiver AT, such as those described in connection with USBs 275, NFCs 280, WRTs 285, and/or CMTs 290. The controller(s) 200, 205, and others, and transceiver(s) AT, are configured to detect WSs and connect to nearby or proximate or far wired and wireless network devices having in-range WSs, as well as third-party, offboard, external devices such as nomadic, portable, and/or mobile or nomadic mobile and navigation devices, systems, and applications 295.

The one or more controller(s) VSC 200, VCS 205, and others, are configured to generate the various OS 245, CS 250, TS 255, and other signals to include and/or cause generation of one or more signals, conditions, parameters, and/or other data that management and control of the electric and combustion engine drive and propulsion systems, ICE 115 and/or EM 120. The disclosure describes new control systems and methods that enable improved efficiency, which can increase and/or maximize electric only/charge depletion drive mode vehicle range or distance of EM 120 and battery(ies) 175, and which can reduce and/or minimize fuel consumption of ICE 115 during charge sustain, charging, combustion engine drive mode.

HEVs 100 include one or more controller(s) and computing systems, such as MCM/BCM 185, VSC 200, and/or VCS 205, and others, which are configured to manage and control electric only (charge depletion) and combustion engine (charging and charge sustain) drive modes that utilize CE 115 and EM 120. Such controller(s) and systems are also configured to, detect trip signal TS 255 at start-up of HEV 100, and in response to generate and/or estimate a trip distance or trip distance estimate TD 300. The TD 300 may be received as text, audio, voice recognition, and/or as part of a destination DES 305 and/or waypoint 305 from an internal or external navigation system, component, or device, such as for example, HMI 190, GPS 204, navigation system 206, NMDs 295, and/or external networks and servers.

The controller(s) also respond to receiving DES 305, and generate TD 300 according to a current location LOC 310 of the HEV and the destination. The LOC 310 may be detected, received, and/or generated by the vehicle controller(s) and obtained from in-vehicle and onboard as well as external offboard GPS devices including vehicle GPS 204 and navigation system 206, and/or NMDs 295, among other controllers and components. TD 300 may be a one-way or a round-trip distance that HEV 100 must travel to reach DES 305 from LOC 310, and to return therefrom. The controller(s) are also configured to respond to receiving and to communicate DES 305 one or more of the contemplated navigation systems, such as GPS 204, navigation system 206, NMDs 295, and/or navigation systems and applications residing on the external networks and servers, to detect if a charging station XPS/EVSE (FIG. 1) is located at DES 305, according to a response from the one or more navigation system(s).

The HEV 100 of the disclosure also includes the controller(s) configured to detect an electric drive range and/or charge depletion range DR 315, and at least one of battery, cabin, powertrain, and other vehicle component thermal demands THDs 320. The DR 315 and THDs 320 are detected, estimated, and/or predicted according to vehicle performance parameters VPPs 325 that include battery SoC and other performance data, vehicle data VD 330, and external environment and roadway data ERD 335 that is retrieved and/or received from the one or more of controllers that may include VSC 200, VCS 205, and from external networks and servers via communication units that may include V2V 201, I2V/V2I 202, and/or NMDs 295.

THDs 320 include temperature and thermal heating demands and optimal performance parameters and settings of and for various vehicle components, systems, and devices, including for example, transmission and/or transaxle 160, battery(ies) 175, 180, intercooler and/or emissions control system 165, vehicle cabin heater 170, and other vehicle components and systems, each of which include temperature sensors and thermal control systems, and which may require heating to improve performance. Such VPPs 325 can include, for purposes of illustration and example, but not for purposes of limitation, current and predicted vehicle speed, and vehicle coasting, acceleration, braking behavior data, actual fuel remaining and consumption and capacity, actual battery power capacity and power remaining and consumption rates at various vehicle speeds and power settings, and settings and preferences for cabin heater climate controls, interior and external vehicle lighting, infotainment system, navigation system, and other HEV systems, subsystems, components, and/or devices.

VD 330 includes, for purposes of example without limitation, at least one of and/or one or more of vehicle make and model information, vehicle identification number (VIN), OBD, OBD II, PIDs, electrical power and vehicle cooling and heating optimal settings, vehicle power availability and demands, cabin climate control performance parameters, and driver speed, and coasting, acceleration, and braking behavior performance data, and/or other vehicle data. ERD 335 includes, for example without limitation, ambient temperature, precipitation, humidity, atmospheric pressure, and related roadway and traffic conditions, among other information.

The controller(s) according to the disclosure are further configured engage a combustion engine/charge sustain/charging drive mode CECS, which engages ICE 115, if TD 300 exceeds DR 315, and if THDs 320 exceed cumulative and/or respective individual thermal demand thresholds TTs 340. The individual TTs 340 vary according to the respective components of HEV 100. For example, the TT 340 for transmission and/or transaxle 160 may have an optimal performance temperature range that is between about 130 and 250 degrees Fahrenheit, or more or less, and a related thermal demand heating rate and thermal demand that depends upon the current temperature of transmission and/or transaxle 160 and the optimal performance temperature and rage. The optimal temperature range of transmission and/or transaxle 160 is determined such that the viscosity and lubricity of the internal oil and lubricants is high enough to reduce internal friction, which increases the performance and efficiency of transmission and/or transaxle 160.

In other similar examples, battery(ies) 175, 180, and/or intercooler and/or emissions control system 165, also have optimal performance temperature ranges. During low temperature and cold external environmental and weather conditions, battery(ies) 175, 180 must be warmed to optimal temperatures, for improved performance, and charge and discharge operating efficiency. Similarly, ICE 115 intercooler and/or emissions control system 165 also require heating to optimal temperatures to enable improved performance and efficiency. During such cold external environmental and weather conditions, passengers of HEV 100 may also adjust the cabin climate control system to warm cabin and interior heater 170.

All such THDs 320 require thermal energy that must be supplied by either waste heat from ICE 115 and/or electric heating from battery(ies) 175, 180. Utilization of electric energy to meet THDs 320, depletes battery(ies) 175, 180, and reduces DR 315. Under certain conditions, when DR 315 must be maximized, and during start-up of HEV 100, engaging ICE 115 instead of EM 120, to enable utilization of waste heat from ICE 115 and conservation of electric energy from battery(ies) 175, 180, conserves battery power and can maximize available DR 315. Similarly, under other specific conditions, once optimal operating temperatures have been achieved from utilizing waste heat from ICE 115, disengaging ICE 115, and engaging battery-powered EM 120, can conserve and minimize consumption of fuel by ICE 115.

In one example that minimizes fuel consumption, the controller(s) are also configured to switch to and engage EM 120 in the electric drive/charge depletion EDCD drive mode, if DR 315 exceeds TD 300, and the individual and/or cumulative THDs 320 do not exceed the cumulative and/or respective TTs 340 of the various vehicle components, such as transmission and/or transaxle 160, battery(ies) 175, 180, intercooler and/or an emissions control system 165, cabin heater 170, and other components and systems.

Other arrangements of HEV 100 according to the disclosure, include the controller(s) configured to respond to TS 255, and to detect one or more of TD 300, DR 315, and battery, cabin, and powertrain thermal demands and/or temperatures THDs 320. The controller(s) are also enabled in other exemplary configurations to engage EM 120 and the EDCD drive mode, if at least one of: the DR 315 exceeds TD 300, and the battery, cabin, and powertrain temperatures and thermal demands THDs 320 do not exceed respective TTs 340. Further, the controller(s) also engage ICE 115 in the CECS drive mode, if TD 300 exceeds DR 315 and the temperatures and thermal loads THDs 320 exceed the TTs 340.

In additional configurations of HEV 100, the controller(s) are further modified to detect an historical probability of a charge event HPCE 345 at DES 305. The HPCE 345 may be predicted and/or detected according to historical data of past trips to DES 305 and charge events that may or may not have occurred there. Such historical information is accumulated by one or more of the controller(s) and/or stored in repository 230 of HEV 100, such that when DES 305 is subsequently detected, the controller(s) can detect, estimate, and/or predict HPCE 345. A predetermined, adjustable, and/or selectable charge probability threshold CPT 350 may be established and stored in repository 230, and may be 50%, 60%, 75%, and/or any other preferred or desired percentage, such that the controller(s) can automatically establish if HPCE 345 exceeds CPT 350 during operation of HEV 100.

In further exemplary modifications, the controller(s) are also configured to generate TD 300 to be a one-way TD 300, if HPCE 345 exceeds CPT 350, such that the EM 120 and EDCD drive mode are engaged when one-way TD 300 is below, less than, and/or does not exceed DR 315. For example, if HPCE 345 detected to be about 60% based on past trips to DES 305, and CPT 350 is predetermined to be about 50%, then HPCE 345 exceeds CPT 350. In another example, if TD 300 is detected to be 20 miles or about 32 kilometers, a typical total distance may require a return TD 300 of an equal distance. But, if HPCE 345 exceeds CPT 350, such that it is highly likely that a charge event will occur upon reaching DES 305, then HEV 100 may be configured to expend electric battery power, since it can be recharged at DES 305. Otherwise, electric battery power should be conserved, such that HEV 100 has sufficient energy to return to LOC 310.

In other arrangements, the controller(s) are modified to also detect the historical probability of a round-trip distance HPRT 355, and to generate TD 300 to be a round-trip TD 300, if the HPRT 355 exceeds a round-trip probability threshold RPT 360, such that the CECS drive mode and CE 115 are engaged when the round-trip TD 300 exceeds DR 315. Additional variations include the controller(s) configured to detect the historical probability that the destination is a final destination HPFD 365, and to engage the CECS drive mode when HPFD 365 is below, less than, and/or does not exceed a final destination probability threshold FPT 370.

The controller(s) are also modified in similar configurations to detect that HPFD 365 is the final destination TD 300 that includes the charge event HPFD-CE 375, and to generate TD 300 to be the one-way distance TD 300 when HPFD-CE 375 exceeds a combination final destination and charge event probability threshold FCPT 380. The controller(s) of this adaptation are also configured to engage the EM 120 and EDCD drive mode when DR 315 exceeds the one-way TD 300, and such that CE 115 and the CECS drive mode are engaged when at least one of the one-way TD 300 exceeds the range and/or the HPFD-CE 375 is below, less than, and/or does not exceed the FCPT 380.

The disclosure also contemplates variations with the controller(s) configured to disengage CE 115 and the CECS drive mode, and to engage EM 120 and EDCD drive mode, responsive to detecting signal conditions OS 245 for at least one of idling and low engine efficiency. In cooperative configurations and other adaptations, the controller(s) are further configured to: disengage CE 115 and the CECS drive mode, and to engage EM 120 and the EDCD drive mode, responsive to detecting a reduction in THDs 320 below TTs 340 for at least one of: transmission and/or transaxle 160, intercooler 165, emissions control system 165, battery(ies) 175, 180, cabin heater 170, and/or other vehicle components and systems. The various arrangements of the controller(s) include modification that disengage EM 120 and the EDCD drive mode, and engage CE 115 and the CECS drive mode, responsive to detecting THDs 320 increasing above TTs 340 for at least one of: transmission and/or transaxle 160, intercooler 165, emissions control system 165, battery(ies) 175, 180, cabin heater 170, and/or other vehicle components and systems.

With continued reference to FIG. 1, and now also to FIG. 2, methods of operation of the disclosure include methods of controlling vehicle and HEV 100, and the various onboard systems, subsystems, components, and/or devices. In view of the components, controllers, systems, and capabilities already described, such methods contemplate enabling such methods by the controller(s) designated in FIG. 2 generally as controller(s) 400, and which may include for purposes of illustration but not for purposes of limitation, at least one of and/or one or more of controller(s) VSC 200, VCS 205, PCU 215, TCU 220, MCM/BCM 185, and/or ECU/EMS 225, as well as communication unit(s) and transceivers AT, VSC 200, V2V 201, V2I/I2V 202, and/or VCS 205, among others. Such methods of operation start at step 405, and at step 410 include detecting TS 255, which identifies initial and/or continuing vehicle operation and use.

At step 415, the method includes detecting, predicting, receiving, and/or generating TD 300 and DES 305, LOC 310, and detecting, predicting, and/or estimating DR 315, battery, cabin, and powertrain THDs 320, VPPs 325, VD 330, ERD 335, and/or TTs 340, as already described elsewhere herein. At steps 420, 425, and 430, the methods of controller(s) 400 also include engaging CE 115 and CECS drive mode (step 425) if at step 420, at least one of: TD 300 exceeds DR 315, and one or more of THDs 320 exceed respective TTs 340. At step 430, the methods engage EM 120 EDCD drive mode, if DR 315 exceeds TD 300 and the TTs 340 exceed THDs 320.

The methods of controller(s) 400 also include variations also at step 415 directed to communicating the destination to the internal and/or external navigation systems, and detecting if the charging station XPS/EVSE is located at DES 305, according to the navigation system(s) response(s). The methods also include modifications for detecting HPCE 345 at DES 305 in step 435, and at step 440, generating TD 300 to be the one-way TD 300 if the HPCE 345 exceeds the CPT 350, such that the EDCD drive mode is engaged at step 430 when DR 315 exceeds the one-way TD 300.

Additional variations of the methods of controller(s) 400 include at recursive and feed-forward step 435, again with respect to DES 305, detecting if HPRT 355 exceeds RPT 360, if HPFD 365 exceeds FPT 370, and/or if HPFD-CE 375 exceeds FCPT 380, and generating either the one-way TD 300 at step 440, or the round-trip TD 300 at step 445, as also described elsewhere herein, such that the appropriate CECS or EDCD drive mode is engaged.

In other exemplary variations of the methods of the controller(s) 400 and disclosure, the controller(s) are also configured for disengaging the CE 115 and CECD drive mode, and engaging EM 120 and the EDCD drive mode at step 430, responsive to detecting: signal conditions OS 245, CS 250 for at least one of idling and low engine efficiency (step 415), and THDs 320 reduction below respective TTs 340 (step 420) for at least one of: transmission and/or transaxle 160, intercooler 165, emissions control system 165, battery(ies) 175, 180, cabin heater 170, and/or other vehicle components and systems. As the appropriate drive modes are engaged at steps 425 and 430, control then passes to end step 450, which returns control again to start step 405.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. vehicle comprising:
   an internal combustion engine;
   an electric machine coupled to the internal combustion engine and configured to selectively provide torque to at least one wheel of the vehicle in an electric drive mode;
   a traction battery coupled to the electric machine; and
   at least one controller coupled to the internal combustion engine and the electric machine, the at least one controller configured to:
      receive a start signal for a trip having a destination;
      generate a distance of the trip based on at least the destination and a historical probability of a charge event at the destination;
      determine an electric drive range for operation of the vehicle in the electric drive mode;
      engage the electric drive mode responsive to the electric drive range exceeding the distance of the trip, or a powertrain temperature being less than a threshold; and engage an internal combustion engine drive mode responsive to the distance of the trip exceeding the electric drive range and the powertrain temperature exceeding the threshold.

2. The vehicle according to claim 1, comprising:
the controller further configured to, in response to receiving the destination:
generate the distance according to a current location and the destination.

3. The vehicle according to claim 1, comprising:
the controller further configured to, in response to receiving the destination:
communicate the destination to a navigation system; and
detect if a charging station is located at the destination according to a navigation system response.

4. The vehicle according to claim 1, comprising:
the controller further configured to, in response to receiving the destination:
generate the distance as a one-way distance if the historical probability exceeds a charge probability threshold,
such that the electric drive mode is engaged when the one-way distance does not exceed the electric drive range.

5. The vehicle according to claim 1, comprising:
the controller further configured to, in response to receiving the destination:
generate the distance as a round-trip distance if the historical probability is less than a charge probability threshold,
such that the internal combustion engine drive mode is engaged when the round-trip distance exceeds the electric drive range.

6. The vehicle according to claim 1, comprising:
the controller further configured to:
disengage the internal combustion engine drive mode, and engage the electric drive mode,
in response to detecting signal conditions for at least one of idling and low efficiency of the internal combustion engine operation.

7. The vehicle according to claim 1, comprising:
the controller further configured to:
disengage the internal combustion engine drive mode, and engage the electric drive mode,
in response to detecting a thermal load demand reduction below an associated threshold for at least one of: a battery, a cabin heater, an intercooler, an emissions control system, and a transaxle.

8. The vehicle according to claim 1, comprising:
the controller further configured to:
disengage the electric drive mode, and engage the internal combustion engine drive mode,
in response to detecting a thermal load demand increase above an associated threshold for at least one of: a battery, a cabin heater, an intercooler, an emissions control system, and a transaxle.

9. A vehicle, comprising:
a combustion engine;
an electric machine coupled to a battery and configured to provide propulsive power to the vehicle; and
a controller configured to:
receive a destination for a trip and determine a trip distance estimate based at least on the destination and an historical probability of the vehicle charging the battery at the destination;
engage a combustion engine drive mode if the trip distance estimate exceeds an electric drive range, or if a powertrain thermal demand exceeds an associated thermal demand threshold; and
engage an electric drive mode if the electric drive range exceeds the trip distance estimate and the powertrain thermal demand is below the associated thermal demand threshold.

10. The vehicle according to claim 9, comprising:
the controller further configured to, in response to receiving the destination:
communicate the destination to a navigation system; and
detect if a charging station is located at the destination according to a navigation system response.

11. The vehicle according to claim 9, comprising:
the controller further configured to, in response to receiving the destination:
generate the trip distance estimate based on a one-way distance to the destination if the historical probability exceeds a charge probability threshold,
such that the electric drive mode is engaged when the electric drive range exceeds the one-way distance.

12. The vehicle according to claim 9, comprising:
the controller further configured to:
disengage the combustion engine drive mode and engage the electric drive mode in response to detecting:
signal conditions for at least one of idling and low efficiency of the internal combustion engine, and a thermal load demand reduction below an associated threshold for at least one of:
the battery, a cabin heater, an intercooler, an emissions control system, and a transaxle.

\* \* \* \* \*